Patented May 18, 1926.

1,585,412

UNITED STATES PATENT OFFICE.

EMIL PODSZUS, OF BERLIN-FRIEDRICHSHAGEN, GERMANY.

PROCESS OF PRODUCING SUBSTANCES FROM BORON AND CARBON.

No Drawing.    Application filed September 15, 1923.   Serial No. 663,007.

My invention relates to a process for the manufacture of substances which are chiefly produced by the melting of a mixture of boron and carbon and which are of a hardness not only surpassing that of all other known substances but approaching the hardness of diamonds and in case of the correct composition even exceeding the latter.

Of the actual compounds heretofore made from boron and carbon the existence of boron carbide ($B_6C$) only has been proved beyond any doubt, and various processes of producing it have been proposed. The compound $B_2C_2$ which is said to exist, but the existence of which has not yet been proved, does in reality not exist but it constitutes a mixture containing a considerable quantity of graphite. According to Tucker (compare Gmelin-Kraut, Handbook of Inorganic Chemistry, volumes 1 and 2, pages 812 and following) this is a material consisting of a mixture of boron carbide ($B_6C$) and graphite.

Tucker has already tried to produce boron carbide by melting the anhydride of boric acid and coal under pressure. In that case however, the object was to obtain compounds abounding in boron, such as $B_6C$, by employing the anhydride of boric acid in excess. According to this process, the final product consists chiefly of $B_6C$ which is quite irregularly mixed with graphite. According to Tucker's own statement, he obtained products which could be used only by employing pure $B_6C$ and then to a small extent only.

Boron-carbide $B_6C$ is already distinguished by an extremely great hardness. This valuable property is however detrimentally affected by a certain degree of brittleness. Even crystals having an edge length up to 6 millimeters, as were produced by the inventor, did not possess the desired degree of hardness.

The present invention shows how these unfavorable properties of the boron-carbide may be considerably improved and above all also how the hardness may be increased. The invention avoids the disadvantages which are principally the consequence of the said unfavorable properties and the principal cause of which the inventor has found to be the non-homogeneousness and the local composition. According to my invention, a homogeneous molten mass of boron and carbon is produced, in which such an amount of carbon shall be dissolved, that a larger amount of carbon than in $B_6C$ is obtained and in which it is possible to increase the amount of carbon continuously until the molten mass is saturated therewith. However, the process should be continued to such a point only that upon a cooling of the substance no injurious quantities of graphite become disengaged, for it is the carbon which imparts to the product the favorable properties.

The amount of carbon which can be absorbed by the boron amounts under favorable conditions only to a little more than 30 per cent. By the use of higher pressures it is however possible to slightly increase the amount of carbon of the molten mass. But the pressure must be raised to a very considerable extent, if it is desired to increase the amount of carbon by a few per cent only. The application of an increasing pressure will therefore very soon end in a process which is practically unmanageable. In every case the limit of the process is fixed by the quantity which also upon a cooling of the mass remains dissolved or does not become disengaged in an injurious shape.

A particularly favorable result with regard to the mechanical properties is obtained, if the carbon is added to the boron in such a quantity that the final product is, for instance, $B_3C$ containing perhaps 26 or 27 per cent carbon. This product may be safely made also under ordinary pressure. This hardness of the product reaches that of the diamond and even exceeds it for with this product it is possible to produce scratches on the latter.

A further increase in the amount of carbon contained in the product in a dissolved state is possible by a few additional per cent only and tends to slightly improve the properties of the substance.

The substances obtained in the aforementioned manner possess in addition to extremely great hardness also the property of being of a considerably greater strength than boron-carbide $B_6C$.

It is essential for the best results that a rapid cooling of the molten mass takes place so that the decomposition of the molten mass accompanied by a disengaging of graphite is delayed.

If the amount of added carbon is considerably increased beyond the above mentioned amount, molten masses will still be obtained, but on cooling graphite will become disengaged in such large quantities that the mechanical properties of the substances are considerably adversely affected even in case it has been possible to prevent the evaporation of the boron. This takes place also, in case the molten mass is excessively non-homogeneous, in other words, if at various places an excessive saturation of the carbon is effected, as from there the disengagement of graphite easily extends to the less saturated parts.

A rapid cooling of the boron-carbon compounds is best obtained, if the melting is effected without embedding the substance, for instance by mixing boron and carbon in the right proportion, shaping the mixture into rods, supporting the same at the ends only, melting them by means of an electric current and allowing the molten mass to drop off.

The new boron-carbon compound is best produced in a single operation by heating boron, boric nitrogen, or boron-carbon, or a mixture of them with the right proportion of coal to the required high temperature. Pure boron may, for instance, directly be molten with the necessary quantity of carbon, or the starting material may be boron-carbide $B_6C$ to which, when in a molten condition, the required quantity of coal is added. Further, in case of a very high temperature molten masses of boron or boron-carbide may be subjected to the influence of an atmosphere of coal smoke until the molten mass is sufficiently saturated with carbon.

To further increase the strength of the new substance one may add small quantities (a few per cent) of metals or the carbids thereof having a high melting point, such as tungsten, titanium, tungsten- or titanium carbide. It is, however, advisable to make the additions sufficiently small so that an injurious or appreciable reduction of the hardness does not occur.

Some of the boron may also be replaced by a suitable metal, for instance by tungsten.

I claim as my invention:

1. In the process of manufacturing substances from boron and carbon, the step of evenly dissolving in a molten mixture of boron and carbon or boron-carbide, a quantity of carbon greater than the amount of carbon contained in $B_6C$.

2. In the process of manufacturing substances from boron and carbon, the step of dissolving in the molten mass of boron and carbon such an amount of carbon that the final product contains a maximum amount of about 30 per cent of carbon.

3. In the process of manufacturing substances from boron and carbon, the step of adding to the molten mass of boron and carbon such an amount of carbon that the total amount corresponds approximately to the composition $B_3C$.

4. In the process of manufacturing substances from boron and carbon, the step of working boric nitrogen together with the corresponding quantity of carbon.

5. In the process of manufacturing substances from boron and carbon, the step of effecting a rapid cooling of the molten mass.

6. In the process of manufacturing substances from boron and carbon, the step of allowing the starting material to melt while freely supported and without being embedded, and recovering the substance by allowing it to drop off.

7. In the process of manufacturing substances from boron and carbon, the step of subjecting molten masses of boron and boron-carbide ($B_6C$) to the action of coal smoke at a very high temperature until the corresponding degree of saturation is reached.

8. In the process of manufacturing substances from boron and carbon, the step of melting the substances at a pressure above atmospheric pressure.

9. In the process of manufacturing substances from boron and carbon, the step of adding to the molten mass a small quantity of one or more metals of a high melting point, or the carbides thereof.

EMIL PODSZUS.